United States Patent [19]

Horton

[11] 4,135,398

[45] Jan. 23, 1979

[54] DEPTH GAUGE AND POSITION MARKING DEVICE

[76] Inventor: George F. Horton, Rte. 2, Box 718, Fort Worth, Tex. 76135

[21] Appl. No.: 800,342

[22] Filed: May 25, 1977

[51] Int. Cl.² ............................................. G01F 23/06
[52] U.S. Cl. .......................................... 73/305; 74/63
[58] Field of Search ............................. 73/290 R, 303; 116/118 R; 74/63, 801

[56] References Cited

U.S. PATENT DOCUMENTS

| 608,741 | 8/1898 | Wood | 73/305 |
| 1,287,580 | 12/1918 | Dumaine | 73/305 X |
| 2,685,742 | 10/1954 | Johnson | 73/305 X |
| 3,529,480 | 9/1970 | Kaspareck | 74/63 |

*Primary Examiner*—Charles Gorenstein

*Attorney, Agent, or Firm*—Wofford, Felsman, Fails & Zobal

[57] ABSTRACT

A device for measuring the depth of a body of water and for marking the position of measurement to facilitate structural fishing. The device comprises a base for supporting an annular scale for rotation relative to said base. Float means is provided for supporting the device in the water with a portion of the scale above the surface of the water and with its axis of rotation horizontal. Also provided is a rotatable spool having a line wound around the spool. A weight is connected to the free end of the line for unreeling the line as the weight sinks in the water. Means is coupled between the spool and the annular scale and is responsive to rotation of the spool for rotating the annular scale an amount which is a function of the length of line unreeled from the spool as the weight sinks in the water.

16 Claims, 7 Drawing Figures

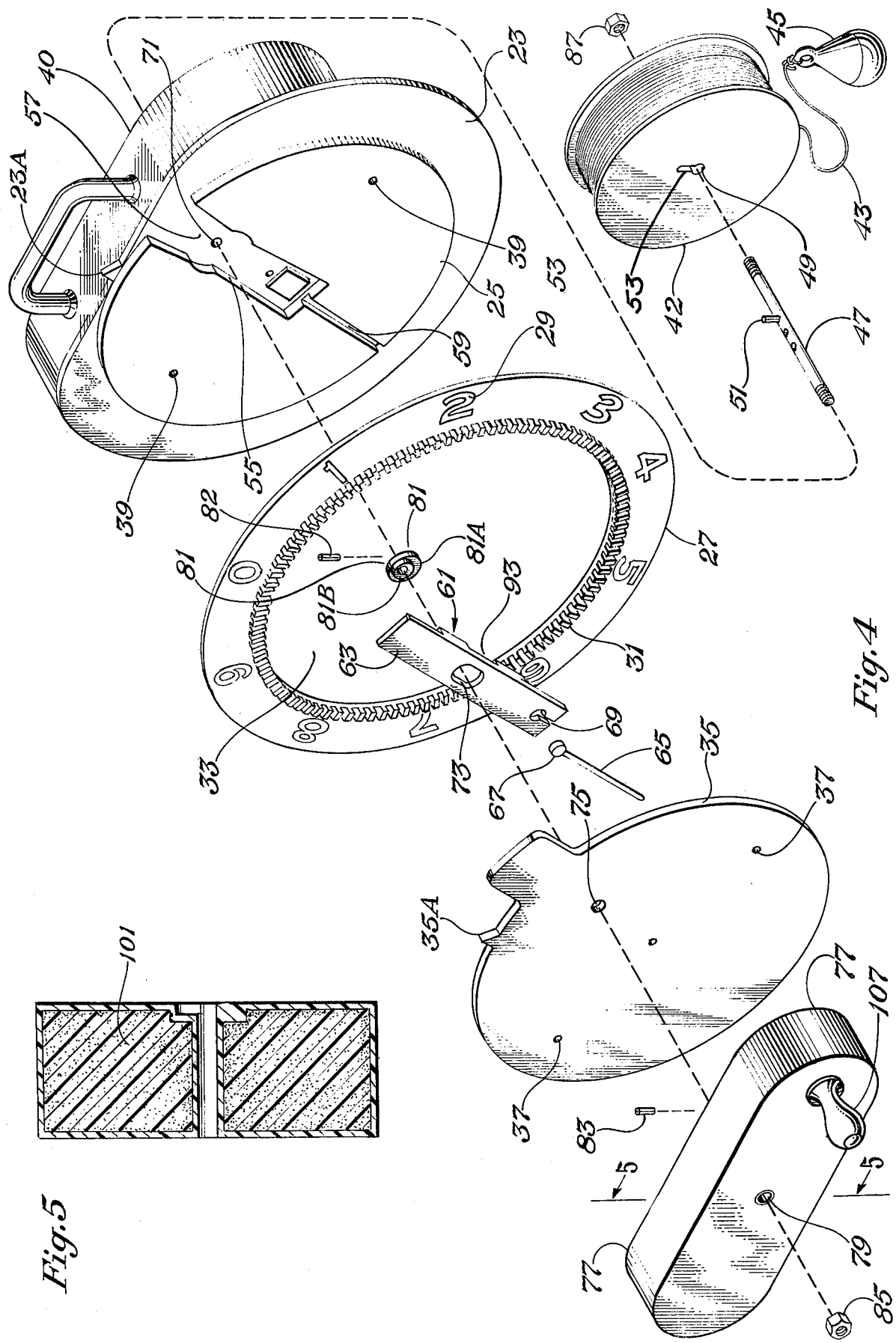

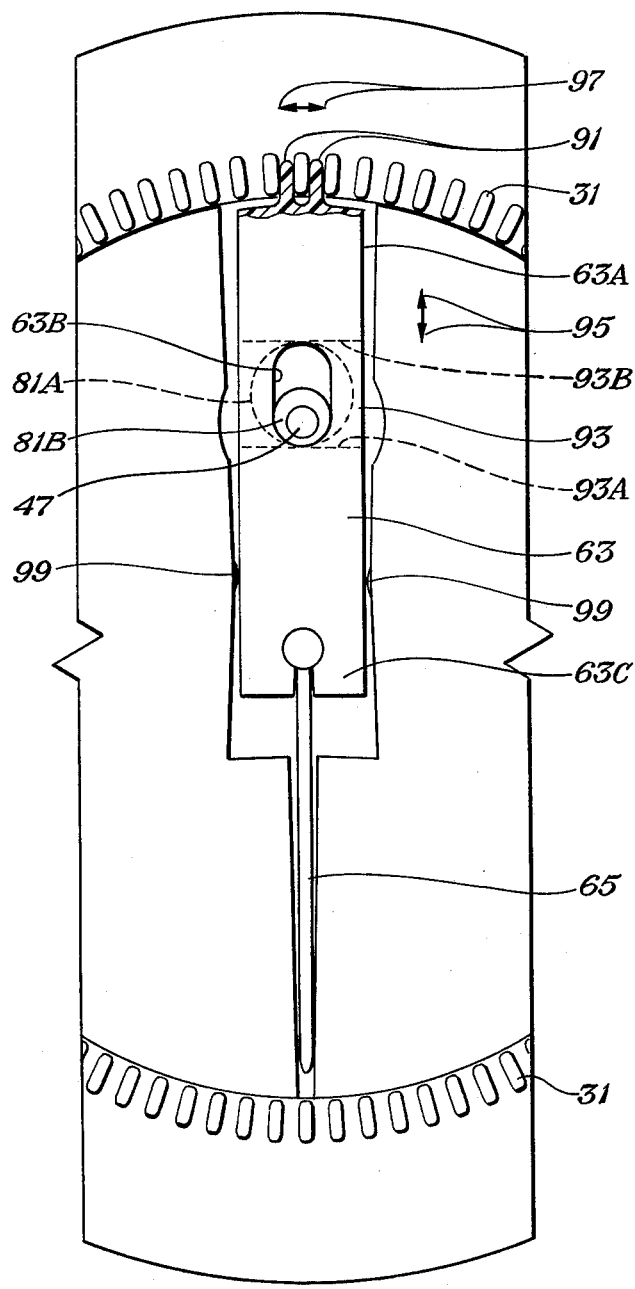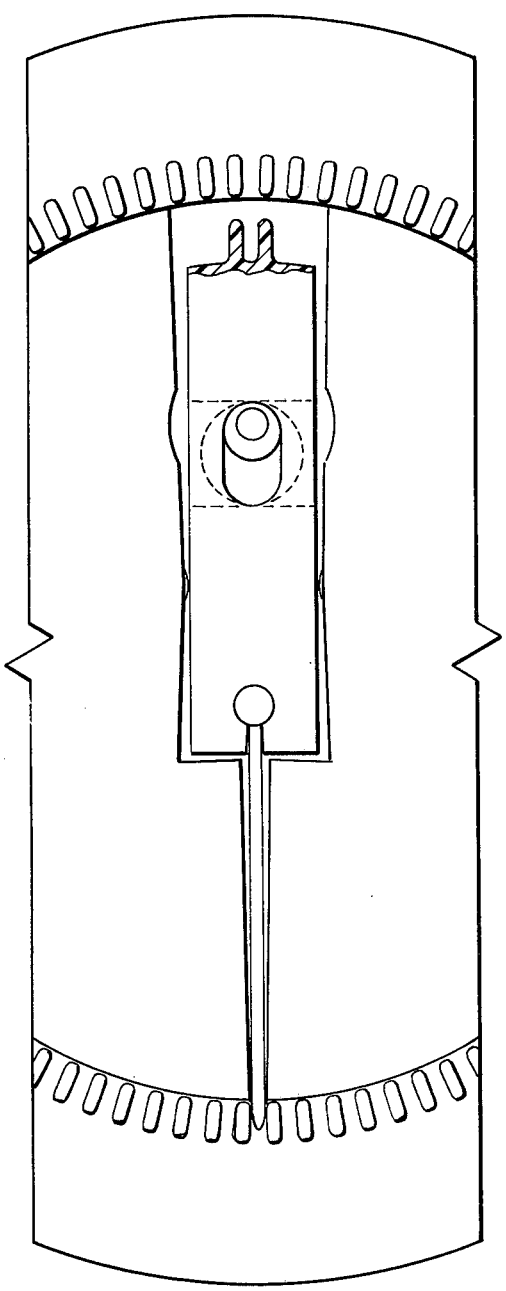

DEPTH GAUGE AND POSITION MARKING DEVICE

BACKGROUND OF THE INVENTION

Sonar depth sounders are used extensively by fishermen to determine the depth of the water. Such devices allow one to chart the bottom from a boat, however, this information without a reference point on the water is not sufficient to allow the fishermen to accurately locate the desired bottom structures where fish are expected.

SUMMARY OF THE INVENTION

It is an object of the present invention to provide a new, effective, and easy to use depth gauge and position marking device which is very useful in combination with information gained from a depth sounder in finding desired bottom structures.

The depth gauge and position marking device comprises base means having scale means supported for movement with respect to said base means. Float means is coupled to said base means for supporting said base means in the water with a portion of the scale means supported above the surface of the water. Spool means is supported for rotation by the base means. A flexible line is wound around the spool means and has weight means attached to its free end. The weight means is capable of unreeling the line from said spool means as it sinks in the water. In addition, drive means is coupled between said spool means and said scale means and is responsive to rotation of said spool means for moving said scale means an amount which is a function of the length of line unreeled from said spool means as said weight means sinks in the water.

In a preferred embodiment, said scale means comprises an annular member supported for rotation with respect to said base means. Said drive means is responsive to rotation of said spool means for rotating said scale means an amount which is a function of the length of line unreeled from said spool means.

In a further aspect, teeth means are formed 360° around said annular member. Said drive means comprises shaft means secured to said spool means for rotation therewith. In addition, there is provided reciprocating means having teeth means at a first end adapted to engage said teeth means of said annular member. Cam means is secured to said shaft means for rotation therewith reciprocating said reciprocating means in a given direction for moving its teeth means into and out of engagement of said teeth means for said annular member. The cam means also moves said reciprocating means in a direction generally transverse to said given direction when said teeth means of said reciprocating means is in engagement with said teeth means of said annular member to cause incremental rotation thereof.

BRIEF DESCRIPTION OF THE DRAWINGS

FIG. 4 is an exploded view of the device of FIGS. 2 and 3;

FIG. 5 is a cross-sectional view of the handle shown in FIG. 2 taken along the lines 5—5 thereof;

FIG. 6 is an enlarged partial cross-sectional view of the device illustrating the annular scale and drive mechanism;

FIG. 7 is a view similar to that of FIG. 6 but showing a different position of the drive mechanism.

DETAILED DESCRIPTION OF THE INVENTION

Figure 1:
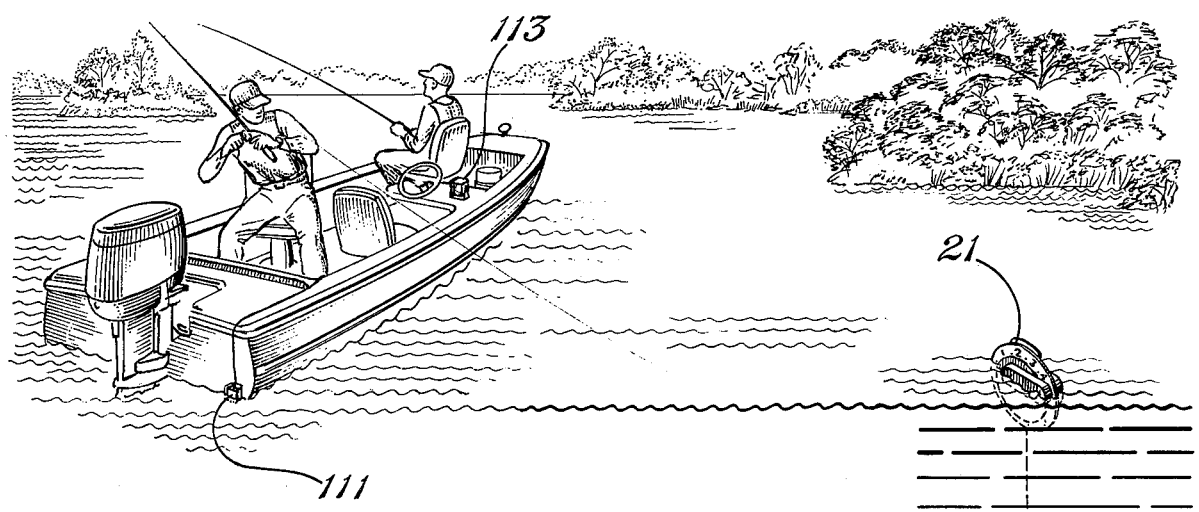
FIG. 1 illustrates the manner in which the depth gauge and position marking device may be used.

Referring now to the drawings, the depth gauge and position indicating device of the preferred embodiment of the present invention is identified by reference numeral 21. It comprises a transparent base member 23 having a circular projection 25 for supporting an annular scale 27 for rotation. The annular scale 27 has indicia marks 29 formed on both sides and gear teeth 31 formed on one side 360° around its annular surface next to its inner periphery. The projection 25 extends through the opening 33 of the annular scale 27 and projects a short distance beyond. A flat transparent cover 35 is secured to the base 23 by rivets 24 (see FIG. 2) which extend through openings 37 and 39 formed through the cover 35 and base 23 respectively. The cover 35 has a diameter slightly greater than the inside diameter of the scale 27 whereby the scale is held between the base and the cover and is supported for rotation around the projection 25.

Secured to the other side of the base 23 is a case 40 containing flotation material. Formed through the case 40 is a circular opening 41 for supporting a spool 42 for rotation therein. Secured to the spool is a flexible line 43 which is wound around the spool and which has a weight 45 attached to its free end. The line 43 is adapted to be unreeled from the spool and pulled to the bottom of the water by the weight. A shaft 47 extends through an aperture 49 formed through the spool. A pin 51 is secured to the shaft 47 and fits in a slot 53 to secure or key the shaft to the spool such that the shaft turns with the spool when the weight unreels the line from the spool.

Formed in the circular projection 25 is a slot 55 having a large rectangular portion 57 and a thin portion 59. A reciprocating member 61 fits in the slot for reciprocation therein. The reciprocating member 61 comprises a rectangular member 63 having a pointed member 65 coupled thereto. The pointed member 65 has an enlarged head 67 which fits in a slot 69 formed in the end of the member 63. In assembly, the shaft 47 extends through an aperture 71 formed through the base 23; through an aperture 73 formed through the member 63 and through an aperture 75 formed through the cover 35. A crank 77 is provided which has an aperture 79 formed therethrough for receiving the shaft. A cam 81 is keyed to the shaft 47 by way of a pin 82 for rotation therewith. The crank 77 also is keyed to the shaft 47 by a pin 83 for rotation therewith. Bolts 85 and 87 are threaded to opposite ends of the shaft to secure the assembly together.

The purpose of the cam 81 is to reciprocate the member 63 to cause the annular scale 27 to rotate an amount dependent upon the length of the line 43 unreeled from the spool 42 as the weight 45 sinks to the bottom. The backside of the member 63 at end 63A has two teeth 91 formed therein and which are adapted to engage the teeth 31 of the annular scale 27 as the member 63 is moved toward the teeth as shown in FIG. 6. As the member 63 is moved away from the teeth 31, teeth 91 disengage teeth 31 and the pointed member 65 engages opposite teeth 31 as shown in FIG. 7. The cam 81 is secured to the shaft 47 in an eccentric position and comprises a larger cam member 81A and a smaller cam member 81B which are integral with each other. The larger cam member 81A fits in a slot 93 formed in the backside of the member 63 while the smaller cam 81B fits in the aperture 73 formed through the member 63. As the line 43 is withdrawn from the spool the spool is turned thereby causing the shaft 47 to turn. As the shaft 47 turns, the larger eccentric cam member 81A turns in the slot 93 and engages surfaces 93A and 93B thereof. This causes the member 63 to reciprocate in opposite directions as shown by arrows 95 to cause the teeth 91 to engage the teeth 31 and then to disengage the teeth 31. In addition, the smaller eccentric cam 81B turns in the aperture 73 and engages surface 63B which forms the aperture. This causes the end 63A of member 63 to reciprocate in the directions of the arrows 97. Guides 99 allow the opposite end 63C to slide back and forth in the direction of the arrows 95 but prevent end 63C from moving back and forth in the direction of the arrows 97. The system is constructed such that as the shaft 47 and hence cams 81A and 81B turn once, the member 63 will reciprocate once in the direction of the arrows 95 and end 63A will reciprocate once in the direction of the arrows 97.

One cycle now will be described assuming that the member 63 is in the up-stroke position shown in FIG. 6 wherein teeth 91 are engagement with teeth 31. Assume also that shaft 47 turns counter clockwise. As the shaft begins to turn, due to unreeling of the line 43, cam 81A causes the member 63 to begin to move downward. At the same time, cam 81B causes end 63A to move to the left. Since teeth 91 are in engagement with teeth 31, the annular scale 27 is rotated counterclockwise a short increment until the member 63 is moved downward a distance sufficient to disengage teeth 91 from teeth 31. At the point of disengagement, pointed member 65 begins to engage the opposite teeth 31. The purpose of the member 65 engaging the opposite teeth 31 is to prevent the annular scale 27 from rotating, for example, due to wind or wave action, when the teeth 91 are out of engagement with teeth 31. As the shaft 47 continues to turn, the member 63 reaches the bottom of its stroke as shown in FIG. 7. Further rotation of the shaft causes the member 63 to move upward again by the action of the cam 81A. In addition, the end 63A is moved to the right by the action of the cam 81B to line up teeth 91 with the next tooth 31 on the right. Further upward movement of the member 63 causes its teeth 91 to engage teeth 31 again. As the up stroke is approached, end 63A is moved left again to the up stroke position shown in FIG. 6. The cycle is repeated as the line 43 is continued to be unreeled.

The system is calibrated such that one complete cycle results in about one foot of line being withdrawn from the spool 42. Thus, each incremental movement of the teeth 31 and hence of the annular scale 27 during each cycle represents about one foot of line unreeled and hence about one foot of water depth. Stated in another way, for about each foot of line unreeled from spool 42, the annular scale 27 is rotated an angular amount corresponding to the width of one tooth 31. Each of the indicia marks 29 represent 10 feet and can be seen at a distance by a fisherman in a boat. In the preferred embodiment, the annular scale 27 has 100 equally spaced teeth 31. Thus, depth measurements can be made up to 100 feet. Pointers 35A and 23A are provided to facilitate reading the depth. When the line 43 is fully wound on the spool 42, the zero indicia mark on the scale will be aligned with the pointers 35A and 23A. As the weight unreels the line, the scale 27 is turned to reflect the depth. The weight 45 will continue to unreel line 43 from the spool until it reaches the bottom.

The elongated crank 77 is filled with flotation material 101. Flotation material also is provided on the inside of the spool 42. When the device 21 is floating in the water and the crank 77 is in a horizontal position, its center line is at about the surface of the water as shown in FIG. 1. When the line 43 is unreeled from the spool, the crank 77 turns with the spool 42 as indicated above. The weight 45 is heavy enough such that the crank 77 does not prevent the weight 45 from unreeling the line 43 as it sinks to the bottom. When the weight 45 reaches the bottom, however, the flotation material in the crank 77 and the fact that the crank 77 is elongated prevent the spool 42 from continuing to unreel and also prevents the spool 42 from turning by wind or wave action.

Figures 2, 3:
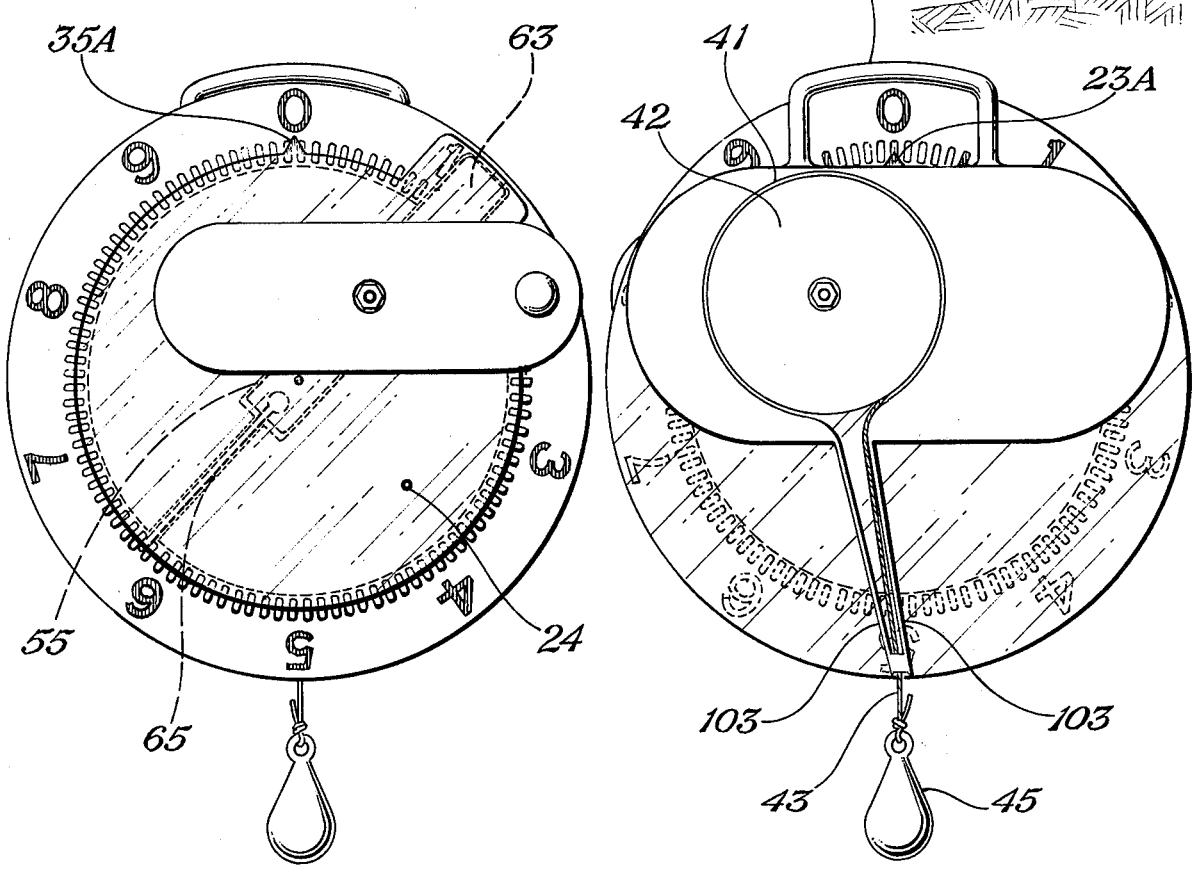
FIG. 2 illustrates one face of the device of the present invention.
FIG. 3 illustrates an opposite face of the device of FIG. 2.

The device is constructed such that when it floats in the water the slot 55 and members 63 and 65 are tilted as shown in FIG. 2. The spool 42 is located off-center of the axis of rotation of the annular scale 27 as shown in FIG. 3. As seen in FIG. 3, guides 103 extend angularly from the spool receiving opening 41 to the bottom of the device for the passage of the line 43 from the spool. Pointers 35A and 23A are located at the top of the device. A stationary handle 105 is attached to the case 40 to facilitate handling. A knob 107 is attached to the crank 77 to facilitate winding.

In use, the crank 77 is rotated by the fisherman to wind the line 43 on the spool until the zero indicia is next to the pointers 23A and 35A. The fisherman will then drop the device in the water. The weight will sink unreeling the line until it reaches the bottom. At this point, the annular scale 27 will have been rotated to a position opposite the pointers 23A and 35A to reflect the correct depth of the water. The weight 45 will prevent the wind from blowing the device from its position on the water. The fisherman in his boat then can move away from the device and operate a conventional depth sounder to chart the bottom of the water from the device. As shown in FIG. 1, a conventional depth sounder comprises a transducer 111 and a readout 113. Since the indicia numbers 29 are large, the fisherman can read the depth of the water below the device 21 and at the same time read from the readout 113, the depth of the water below the boat as it is moved from the device 21. Of interest are sharp drop offs of the bottom where fish tend to congregate. Thus, as can be understood, the device 21 provides a depth gauge and position marker which is very useful in combination with a conventional depth sounder in locating desired bottom structure where fish are expected.

In the preferred embodiment, the device 21 is constructed such that the member 63 moves totally $\frac{1}{8}$ of an inch from the upstroke to the downstroke and the end 63A moves totally $\frac{1}{4}$ of an inch in the direction of the arrows 97. The flotation material in the case 40, in the spool 42 and in the crank 77 may be commercially available styrofoam. It is to be understood that other types of drive mechanisms may be employed to rotate the annular scale 27 as the line 43 is unreeled from the spool.

Although the scale disclosed in an annular scale, it is to be understood that the scale could be a linear scale which is moved upward an amount dependent upon the amount of line 43 unreeled from the spool by the weight as it sinks in the water. In this embodiment, the amount of upward displacement of the linear scale would reflect the depth of the water.

I claim:

1. A depth indicator for determining the depth of a body of water, comprising:
    base means, scale means supported for rotation with respect to said base means,
    float means coupled to said base means for supporting said base means in the water with a portion of said scale means supported above the surface of the water and with its axis of rotation generally horizontal,
    spool means supported for rotation by said base means,
    a flexible line wound around said spool means and having weight means attached to its free end,
    said weight means being capable of unreeling said line from said spool means as it sinks in the body of water, and
    drive means coupled between said spool means and said scale means and responsive to the rotation of said spool means for rotating said scale means an amount which is a function of the length of line unreeled from said spool means as said weight means sinks in the body of water,
    said scale means comprising an annular member,
    teeth means formed 360 degrees around said annular member,
    said drive means comprising,
        shaft means secured to said spool means for rotation therewith.
        reciprocating means having teeth means at a first end adapted to engage said teeth means of said annular member, and
        cam means secured to said shaft means for rotation therewith for reciprocating said reciprocating means in a given direction for moving its teeth means into and out of engagement with said teeth means of said annular member,
        said cam means also being employed for moving said reciprocating means in a direction generally transverse to said given direction when said teeth means of said reciprocating means is in engagement with said teeth means of said annular member to cause incremental rotation thereof.

2. The indicator of claim 1 comprising:
    engaging means formed at the opposite end of said reciprocating means for engaging opposite teeth means of said annular member when said teeth means at said first end of said reciprocating means are out of engagement with said teeth means of said annular member.

3. The indicator of claim 1 wherein:
    said reciprocating means has first and second cam engaging surfaces,
    said cam means comprises first and second cam members for engaging said first and second cam engaging surfaces respectively of said reciprocating means.

4. The indicator device of claim 2 wherein:
    said reciprocating means has first and second cam engaging surfaces,
    said cam means comprises first and second cam members for engaging said first and second cam engaging surfaces respectively of said reciprocating means.

5. A depth indicator for determining the depth of a body of water, comprising:
    base means,
    scale means supported for movement with respect to said base means,
    float means coupled to said base means for supporting said base means in the water with a portion of said scale means supported above the surface of the water,
    shaft means supported for rotation by said base means,
    spool means coupled to said shaft means for rotating said shaft means upon rotation of said spool means,
    a flexible line wound around said spool means and having weight means attached to its free end for unreeling said line from said spool means and causing rotation of said spool means as said weight means sinks in the body of water,
    means coupled between said shaft means and said scale means and responsive to the rotation of said shaft means for moving said scale means an amount which is a function of a length of line unreeled from said spool means as said weight means sinks in the body of water,
    crank means comprising floatation material connected to said shaft means for rotation therewith as said spool means is rotated when said line is unreeled therefrom and for rotating said shaft means and hence said spool means for reeling said line on said spool means,
    at least a portion of said crank means being located in water when said base means is supported in water,
    the shape of said crank means and the presence of said floatation material preventing said spool means from turning when said base means is supported in water and when said weight means rests on the bottom of the body of water,
    said weight means being heavy enough to unreel said line from said spool means and to turn said spool means and said crank means to allow said weight means to sink in the body of water until it reaches and rests on the bottom of the body of water.

6. The depth indicator of claim 5, wherein:
    said crank means is elongated in shape and is connected to said shaft means at a position such that a portion of said crank means is located in the water and a portion is located out of the water when said base means is supported in the water.

7. The depth indicator of claim 5 wherein:
    said scale means is supported for rotation with respect to said base means,
    when said base means is supported in water, said scale means is supported above the surface of the water with its axis of rotation generally horizontal,
    said means coupled between said shaft means and said scale means being responsive to the rotation of said shaft means for rotating said scale means an amount which is a function of the length of line unreeled from said spool means as said weight means sinks in the body of water.

8. The depth indicator of claim 7, wherein:
    said crank means is elongated in shape and is connected to said shaft means at a position such that a portion of said crank mean is located in the water and a portion is located out of the water when said base means is supported in water.

9. A depth indicator for determining the depth of a body of water, comprising:

base means having a top end and a bottom end,
scale means supported for movement with respect to said base means,
float means coupled to said base means for supporting said base means in the water with said top end located above the surface of the water,
said scale means having a side surface located generally perpendicular to the surface of the water when said base means is supported in the water,
indicia representative of deth formed on said side surface,
a portion of said scale means being supported for movement above said top end of said base means such that said indicia formed on said portion of said scale means is viewable from a position space laterally from said base means,
shaft means supported for rotation by said base means,
spool means coupled to said shaft means for rotating said shaft means upon rotation of said spool means,
a flexible line wound around said spool means and having weight means attached to its free end,
said weight means being capable of unreeling said line from said spool means as it sinks in the body of water,
drive means coupled between said shaft means and said scale means and responsive to the rotation of said shaft means for moving said scale means an amount which is a function of the length of line unreeled from said spool means as said weight means sinks in the body of water, and
crank means comprising floatation material connected to said shaft means for rotation therewith as said spool means is rotated when said line is unreeled therefrom and for rotating said shaft means and hence said spool means for reeling said line on said spool means,
at least a portion of said crank means being located in water when said base means is supported in water,
the shape of said crank means and the presence of said floatation material preventing said spool means from turning when said base means is supported in water and said weight means rests on the bottom of the body of water,
said weight means being heavy enough to unreel said line from said spool means and to turn said spool means and said crank means to allow said weight means to sink in the body of water until it reaches and rests on the bottom of the body of water.

10. The depth indicator of claim 9 wherein:
said crank means is elongated in shape and is connected to said shaft means at a position such that a portion of said crank means is located in the water and a portion is located out of the water when said base means is supported in water.

11. A depth indicator for determining the depth of a body of water, comprising:
base means,
scale means supported for rotation with respect to said base means,
said scale means having at least one side surface in a plane perpendicular to the axis of rotation of said scale means,
indicia representative of depth formed on said one side surface of said scale means,
float means coupled to said base means for supporting said base means in the water with a portion of said scale means supported above the surface of the water with its axis of rotation being generally horizontal,
said indicia formed on said portion of said scale means supported above the surface of the water being viewable from a position spaced laterally from said base means,
shaft means supported for rotation by said base means,
spool means coupled to said shaft means for rotating said shaft means upon rotation of said spool means,
a flexible line wound around said spool means and having weight means attached to its free end,
said weight means being capable of unreeling said line from said spool means as it sinks in the body of water,
drive means coupled between said shaft means and said scale means and responsive to the rotation of said shaft means for rotating said scale means an amount which is a function of the length of line unreeled from said spool means as said weight means sinks in the body of water, and
crank means comprising floatation material connected to said shaft means for rotation therewith as said spool means is rotated when said line is unreeled therefrom and for rotating said shaft means and hence said spool means for reeling said line on said spool means,
at least a portion of said crank means being located in water when said base means is supported in water,
the shape of said crank means and the presence of said floatation material preventing said spool means from turning when said base means is supported in water and said weight means rests on the bottom of the body of water,
said weight means being heavy enough to unreel said line from said spool means and to turn said spool means and said crank means to allow said weight means to sink in the body of water until it reaches and rests on the bottom of the body of water.

12. The depth indicator of claim 11 wherein:
said crank means is elongated in shape and is connected to said shaft means at a position such that a portion of said crank means is located in the water and a portion is located out of the water when said base means is supported in water.

13. A depth indicator for determining the depth of a body of water, comprising:
base means,
scale means supported for movement with respect to said base means,
float means coupled to said base means for supporting said base means in the water with a portion of said scale means supported above the surface of the water,
shaft means supported for rotation by said base means,
spool means coupled to said shaft means for rotating said shaft means upon rotation of said spool means,
a flexible line wound around said spool means and having weight means attached to its free end,
said weight means being capable of unreeling said line from said spool means and causing rotation of said spool means as said weight means sinks in the body of water,
control means moveable relative to said scale means and said shaft means for moving said scale means,
means coupled to said shaft means for rotation therewith for operating said control means for moving said scale means an amount which is a function of the length of line unreeled from said spool means as said weight means sinks in the body of water, and crank means comprising floatation material connected to said shaft means for rotation therewith as said spool means is rotated when said line is unreeled therefrom and for rotating said shaft means and hence said spool means for reeling said line on said spool means, at least a portion of said crank means being located in water when said base means is supported in water, the shape of said crank means and the presence of said floatation material preventing said spool means from turning when said base means is supported in water and said weight means rests on the bottom of the body of water said weight means being heavy enough to unreel said line from said spool means and to turn said spool means and said crank means to allow said weight means to sink in the body of water until it reaches and rests on the bottom of the body of water.

14. The depth indicator of claim 13 wherein:

said crank means is elongated in shape and is connected to said shaft means at a position such that a portion of said crank means is located in the water and a portion is located out of the water when said base means is supported in the water.

15. A depth indicator for determining the depth of a body of water comprising:

base means, scale means supported for rotation without axial movement with respect to said base means, float means coupled to said base means for supporting said base means in the water which a portion of said scale means supported above the surface of the water with its axis of rotation generally horizontal, shaft means supported for rotation by said base means, spool means coupled to said shaft means for rotating said shaft means upon rotation of said spool means, a flexible line wound around said spool means and having weight means attached to its free end, said weight means being capable of unreeling said line from said spool means and causing rotation of said spool means as said weight means sinks in the body of water, drive means coupled between said shaft means and said scale means and responsive to rotation of said shaft means for rotating said scale means an amount which is a function of the length of line unreeled from said spool means as said weight means sinks in the body of water, and crank means comprising floatation material connected to said shaft means for rotation therewith as said spool means is rotated when said line is unreeled therefrom and for rotating said shaft means and hence said spool meanns for reeling said line on said spool means, at least a portion of said crank means being located in water when said base means is supported in water, the shape of said crank means and the presence of said floatation material preventing said spool means from turning when said base means is supported in water and said weight means rests on the bottom of the body of water, said weight means being heavy enough to unreel said line from said spool means and to turn said spool means and said crank means to allow said weight means to sink in the body of water until it reaches and rests on the bottom of the body of the water.

16. The depth indicator of claim 15 wherein: said crank means is elongated in shape and is connected to said shaft means at a position such that a portion of said crank means is located in the water and a portion is located out of the water when said base means is supported in water.

* * * * *